United States Patent
Vorobyev

(10) Patent No.: US 8,982,330 B2
(45) Date of Patent: Mar. 17, 2015

(54) METHOD AND APPARATUS OF PROFILING A SURFACE

(75) Inventor: Evgeny Vorobyev, Gwangmyeong-si (KR)

(73) Assignee: Koh Young Technology Inc., Seoul (KR)

(*) Notice: Subject to any disclaimer, the term of this patent is extended or adjusted under 35 U.S.C. 154(b) by 665 days.

(21) Appl. No.: 13/298,969

(22) Filed: Nov. 17, 2011

(65) Prior Publication Data
US 2012/0127305 A1 May 24, 2012

(30) Foreign Application Priority Data
Nov. 19, 2010 (KR) .................... 10-2010-0115351

(51) Int. Cl.
*G01B 11/25* (2006.01)
*G06T 7/00* (2006.01)

(52) U.S. Cl.
CPC .......... *G06T 7/0057* (2013.01); *G01B 11/2518* (2013.01)
USPC ............................... 356/2; 356/603; 356/625

(58) Field of Classification Search
USPC ............... 356/600–636; 702/5; 250/237 G, 250/559.22; 382/154, 206, 108, 149, 141
See application file for complete search history.

(56) References Cited

U.S. PATENT DOCUMENTS

| | | | | |
|---|---|---|---|---|
| 4,087,788 A | * | 5/1978 | Johannesson ................. | 382/241 |
| 5,300,347 A | * | 4/1994 | Underhill et al. ............. | 428/171 |
| 7,286,246 B2 | * | 10/2007 | Yoshida ........................ | 356/605 |
| 7,440,590 B1 | * | 10/2008 | Hassebrook et al. ......... | 382/108 |
| 7,545,516 B2 | * | 6/2009 | Jia et al. ........................ | 356/603 |
| 7,724,379 B2 | * | 5/2010 | Kawasaki et al. ............. | 356/603 |
| 8,391,590 B2 | * | 3/2013 | Yalla et al. .................... | 382/154 |
| 2006/0192149 A1 | * | 8/2006 | Van Dam et al. ........ | 250/492.22 |
| 2008/0117438 A1 | * | 5/2008 | Quirion et al. ................ | 356/610 |
| 2010/0049441 A1 | * | 2/2010 | Wirtz ................................ | 702/5 |
| 2011/0218428 A1 | * | 9/2011 | Westmoreland et al. ..... | 600/425 |

FOREIGN PATENT DOCUMENTS

| | | |
|---|---|---|
| CN | 1437000 | 8/2003 |
| JP | 2004-309240 | 11/2004 |
| JP | 2006-275529 | 10/2006 |
| JP | 2007-322162 | 12/2007 |
| JP | 2009-204343 | 9/2009 |
| JP | 2009-264862 | 11/2009 |
| JP | 2010-271316 | 12/2010 |

* cited by examiner

*Primary Examiner* — Sang Nguyen
(74) *Attorney, Agent, or Firm* — Kile Park Reed & Houtteman PLLC

(57) ABSTRACT

A method and an apparatus of profiling a surface are disclosed. The method comprises projecting slit pattern light toward a target object in at least two directions in sequence to obtain pattern images reflected on the target object, obtaining heights by using the pattern images according to the directions, obtaining vector fields showing a direction of maximum variation of height, obtaining confidence indexes of the heights corresponding to the at least two directions, obtaining integrated vector fields by using the confidence indexes and the vector fields, and calculating height of each position of the target object by using the integrated vector fields. Therefore, accuracy is enhanced.

10 Claims, 3 Drawing Sheets

METHOD AND APPARATUS OF PROFILING A SURFACE

CROSS REFERENCE TO RELATED APPLICATION

This application claims priorities from the benefit of Korea Patent Application No. 10-2010-0115351, filed on Nov. 19, 2010, which is hereby incorporated by references for all purposes as if fully set forth herein.

BACKGROUND OF THE INVENTION

1. Field of the Invention

Exemplary embodiments of the present invention relate to a method and apparatus of profiling a surface or, more particularly, to a non-contact method and a non-contact apparatus of profiling a surface.

2. Discussion of the Background

Various non-contact methods of profiling a surface of a three-dimensional target object have been developed in various ways. In the non-contact methods, a method using a laser and a method using moiré pattern are frequently used.

According to the method using a laser or a method using moiré pattern, a laser or a slit pattern light is irradiated onto a target object in an inclined direction. However, when a target object protrudes in an angle greater than an angle of irradiation of the laser or the slit pattern light, a shadow region where the laser or the slit pattern light cannot arrive may be generated.

In order to solve above problem, a laser or a slit pattern light is irradiated onto a substrate in various directions to obtain a profile of the target object by obtain heights of each position (x,y) of the substrate. However, the heights obtained by irradiating the laser or the slit pattern light do not coincide in general, and the heights involve defects to cause hardship in obtaining accurate height.

SUMMARY OF THE INVENTION

Exemplary embodiments of the present invention provide a method of profiling a surface, which is capable of enhancing accuracy of measuring height.

Exemplary embodiments of the present invention also provide an apparatus capable of embodying the above method.

Additional features of the invention will be set forth in the description which follows, and in part will be apparent from the description, or may be learned by practice of the invention.

An exemplary embodiment of the present invention discloses a method of profiling a surface, comprising projecting slit pattern light toward a target object in at least two directions in sequence to obtain pattern images reflected on the target object, obtaining heights by using the pattern images according to the directions, obtaining vector fields showing a direction of maximum variation of height, obtaining confidence indexes of the heights corresponding to the at least two directions, obtaining integrated vector fields by using the confidence indexes and the vector fields, and calculating height of each position of the target object by using the integrated vector fields.

For example, the confidence indexes may include at least one of a visibility index, a specular index and a shadow index.

For example, the visibility index may be a logical value true (1) when visibility is greater than a visibility threshold value, and the visibility index may be a logical value false (0) when the visibility is equal to or smaller than the visibility threshold value. The specular index may be a logical value true (1) when an summed intensity generated by summing logical values of intensity that is greater than a threshold specular threshold value is greater than or equal to an integrated specular threshold value, and the specular index may be a logical value false (0) when the summed intensity is smaller than the integrated specular threshold value. The shadow index may be a logical value true (1) when an summed intensity generated by summing logical values of intensity that is smaller than a threshold shadow threshold value is greater than or equal to an integrated shadow threshold value, and the shadow index may be a logical value false (0) when the summed intensity is smaller than the integrated shadow threshold value. The confidence indexes of the heights corresponding to the at least two directions may be obtained by using the visibility index, the specular index and the shadow index.

For example, the confidence indexes of the heights corresponding to at least two directions may be obtained by logical add of the visibility index, the specular index and the shadow index.

For example, the confidence indexes of the heights corresponding to at least two directions are obtained by logical add of the visibility index multiplied by an optional logical value of true or false, the specular index multiplied by the optional logical value and the shadow index multiplied by the optional logical value.

For example, the integrated vector fields may be obtained by selecting the vector fields of which a logical value of the confidence index is true and obtaining the integrated vector fields by medial operation of the selected vector fields.

For example, calculating height of each position of the target object may be performed by making Poisson equation of which right side is obtained by applying divergence operator to the integrated vector fields and of which left side is obtained by applying Laplacian operator to the height and solving the Poisson equation to get a solution corresponding to the height.

For example, solving the Poisson equation may be performed by transforming the Poisson equation with a continuous operator ($\partial/\partial x$, $\partial/\partial y$) into discrete Poisson equation with discrete operator, and expressing a solution of the discrete Poisson equation with Fourier series to get a coefficient of the Fourier series.

An exemplary embodiment of the present invention discloses an apparatus of profiling a surface, comprising a supporting part supporting a substrate with a target object, a pattern image projecting parts projecting slit pattern light toward the target object in at least two directions, an image-capturing part capturing pattern images corresponding the at least two directions, which is reflected by the target object in sequence, a memory unit storing the pattern images captured by the image-capturing part, and a computing part obtaining heights corresponding to at least two directions by using the pattern images, obtaining vector fields corresponding to the at least two directions by gradient operating the heights, obtaining confidence indexes of the heights corresponding to at least two directions, obtaining integrated vector fields by using the confidence indexes and the vector fields, and computing height of each position of the target object by using the integrated vector fields.

For example the computing part may include a height calculation unit calculating the heights corresponding to the at least two directions by using the pattern images in sequence, a confidence index calculation unit calculating confidence indexes of the heights corresponding to the at least two directions, a storing unit storing the calculated heights and the calculated confidence indexes, a vector fields calculation unit calculating the vector fields, an integrated vector fields calculation unit calculating the integrated vector fields by using the confidence indexes and the vector fields corresponding to the at least two directions, a boundary setting unit setting a boundary of the target object, and a Poisson equation solving unit solving Poisson equation of which right side is obtained by applying divergence operator to the integrated vector fields and of which left side is obtained by applying Laplacian operator to the height by applying a boundary condition to the boundary set by the boundary setting unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
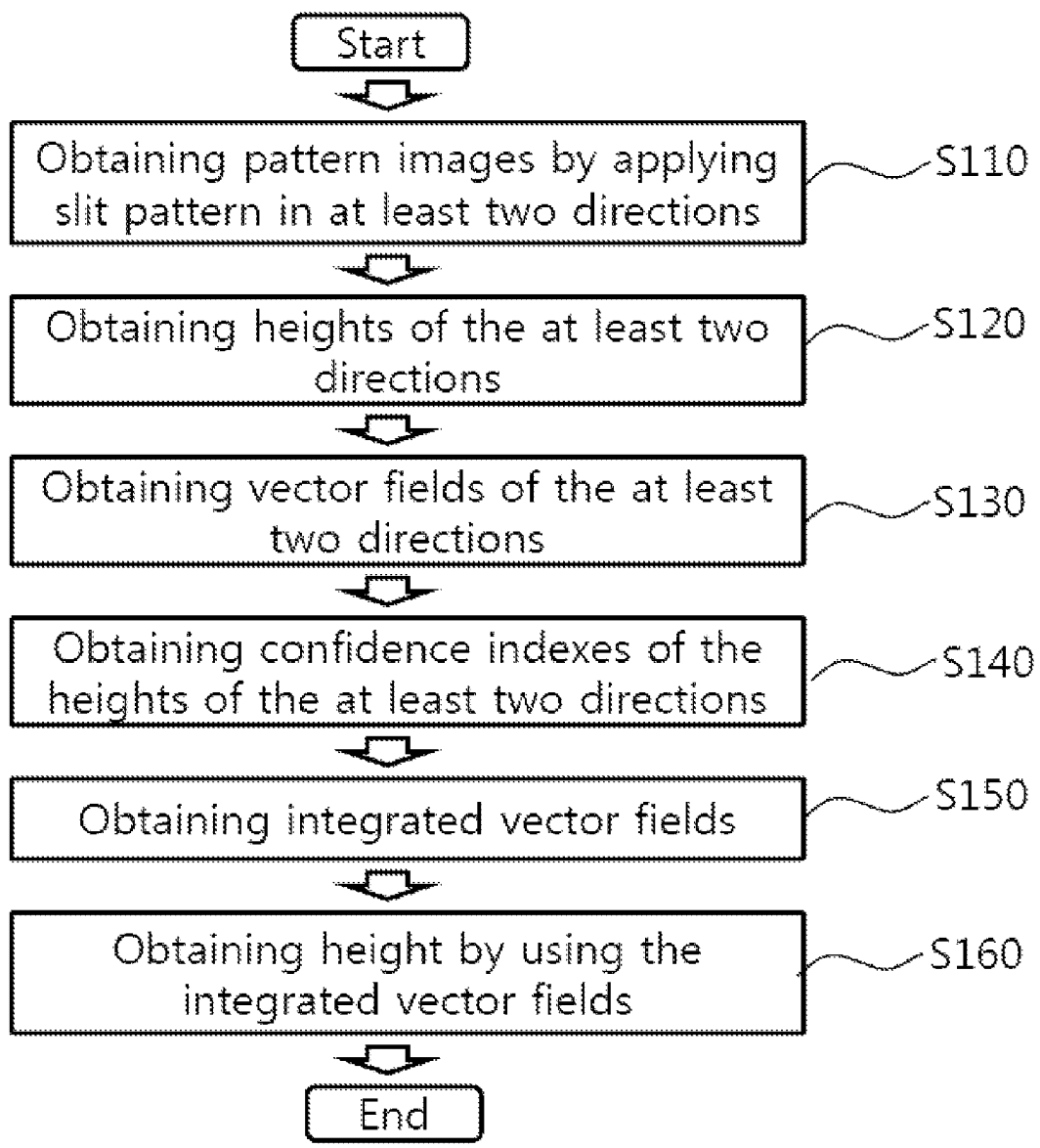
FIG. 1 is a flow chart showing a method of profiling a surface according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, the present invention will be explained in detail, referring to figures.

FIG. 1 is a flow chart showing a method of profiling a surface according to an exemplary embodiment of the present invention.

Referring to FIG. 1, according to a method of profiling a surface of the present invention, slit pattern light is irradiated on a target object in at least two directions in sequence, and target object pattern images are obtained reflected by the target object in sequence (step S110).

For example, the slit pattern light may be irradiated onto the target object in a slanted angle, and the slit pattern light may be generated by making light transmit a grating pattern on which a transparent part and an opaque part are alternatively formed. When slit pattern light is irradiated onto a target object in one direction in order to measure height of the target, the slit pattern light may not arrive opposite portions of the target object to generated shadow region. In this case, the slit pattern light may be irradiated on the target object in other directions to in order to compensate the opposite portions of the target object. Therefore, more accurate height may be measured.

In irradiating slit pattern light, pattern images, for example, are obtained, shifting a grating pattern in each direction. For example, three pattern images are obtained, shifting the grating pattern by a distance equal to ⅓ of a pitch of the grating pattern in 3-bucket algorithm, and four pattern images are obtained, shifting the grating pattern by a distance equal to ¼ of the pitch of the grating pattern in 4-bucket algorithm.

Then, height of the target object is calculated using the pattern images in each direction (step S120).

Pattern images according to slit pattern light passing through a grating pattern may be approximated as a sine function as shown in the following Expression 1.

$$I_{bi} = A + I_0 \sin(\phi_i + \alpha_{bi})$$ Expression 1

In the above expression, the subscript 'b' indicates one of direction in the a plurality of directions (or a channel), subscript 'i' corresponds to an i-th image when a grating pattern is (i−1) times shifted (for example, in N-bucket algorithm, 'i' may be one of natural number of 1 through N), '$I_0$' is a maximum intensity (or Modulation) of a pattern light, 'A' is an average of intensities of pattern images of N-bucket algorithm, and the phase $\alpha_{bi}$ induced by shifting the grating pattern may be expressed as the following Expression 2.

$$\alpha_{bi} = \frac{2\pi(i-1)}{N}$$ Expression 2

Using the above Expression 1, the phase in each direction b may be expressed as the following Expression 3.

$$\phi_b = \tan^{-1}\left[\frac{\sum_{i=1}^{N} I_{bi}\sin(\alpha_{bi})}{\sum_{i=1}^{N} I_{bi}\cos(\alpha_{bi})}\right]$$ Expression 3

Using the above Expression 3, a height $H_b$ in each direction b may be approximated as the following Expression 4.

$$H_b(x, y) = \frac{l_0}{2\pi f_0 d_0} \phi_b(x, y)$$ Expression 4

In the above expression, $I_0$ is a distance between a target object and an image-capturing part for capturing an image of the target object, $d_0$ is a distance between the image-capturing part and a pattern image projecting part projecting slit pattern light, and $f_0$ is a frequency of a sin fridge pattern projected on a reference plane.

Using the above Expression 4, height $H_b$ of each point (x,y) of the target object in each direction (b) may be obtained.

On the other hand, the above method of obtaining the height $H_b$ of each point (x,y) of the target object in each direction (b) is an example, and other methods may be used to get the height $H_b$.

Hereinafter, a method of removing noise in the height $H_b$ of each point (x,y) of the target object in each direction (b), and integrating the height $H_b$ in each direction (b) into one will be explained in detail.

The heights [Hb (x,y)] obtained in each direction (b) may includes, for example, various kinds of defects such as a defect caused by shadows, a defect caused by total reflection (or specular defect), etc. As a result, the height [Hb (x,y)] obtained in each direction (b) may be different from one another. Therefore, exact height may be obtained by integrating the height[H (x,y)] in each direction.

In order for that, vector fields showing direction of maximum variation of heights are obtained (step S130).

The vector fields ($G_b$ (x,y)) in each direction (b) may be obtained using the following Expression 5.

$$G_b(x, y) = \nabla H_b = \left(\frac{\partial H_b(x, y)}{\partial x}, \frac{\partial H_b(x, y)}{\partial y}\right) \quad \text{Expression 5}$$

That is, by gradient operating to the height $H_b$ in each direction (b), the vector fields ($G_b$ (x,y)) in each direction (b) are obtained.

Then, a confidence indexes ($C_b$) regarding the heights $H_b$ in each direction (b) are obtained (step S140). The confidence indexes ($C_b$) may include at least one of a visibility index, a specular index and a shadow index.

In order to obtain the visibility index, the maximum intensity (or modulation) $I_0$ in the Expression 1 may be expressed as the following Expression 6 in case of the 4-bucket algorithm.

$$I_0 = \frac{\sqrt{(I_{b1} - I_{b3})^2 + (I_{b2} - I_{b4})^2}}{2} \quad \text{Expression 6}$$

Further, the average intensity in the A Expression 1 may be expressed as the following Expression 7.

$$A_b = \frac{1}{N}\sum_{i=1}^{N} I_{bi} \quad \text{Expression 7}$$

Then, visibility VF may be expressed as the following Expression 8, which is obtained by the Expression 6 and the Expression 7.

$$VF_b = \frac{I_0}{A_b} \quad \text{Expression 8}$$

The visibility index $VI_b$ according to the present exemplary embodiment may be expressed as the following Expression 9, which is obtained by the visibility VF.

$$VI_b = (VF_b > v_{thr}) \quad \text{Expression 9}$$

In the above expression, $v_{thr}$ is a threshold value of visibility and the threshold visibility $v_{thr}$ may be experimentally determined. The meaning of the Expression 9 is as follows. That is, for example, when the visibility index ($VI_1$) of the first direction in the plurality of directions (b) is greater than threshold value ($v_{thr}$), a logical value true (1) is given to the visibility index ($VI_1$) of the first direction, and when visibility index ($VI_1$) of the first direction is smaller than or equal to the threshold value ($v_{thr}$), a logical value false (0) is given to the visibility index ($VI_1$).

Further, integrated specular indexes ($SpI_b$) in the plurality of directions (b), which regards to the specular defects caused by total reflection, may be expressed as the following Expression 10.

$$SpI_b = \left(\sum_{i=1}^{N}(I_{bi} > sp_{thr}) \geq Sp_{thr}\right) \quad \text{Expression 10}$$

In the above expression, a specular threshold value ($sp_{thr}$) and an integrated specular threshold value ($Sp_{thr}$) may be experimentally determined. The meaning of the Expression 10 is as follows. That is, for example, when an i-th intensity ($I_{1i}$) of a first direction in the plurality of directions, which is i-th intensity of N-bucket algorithm, is greater than the specular threshold value ($sp_{thr}$), a logical value true (1) is given to the i-th intensity ($I_{1i}$), and when the i-th intensity ($I_{1i}$) is smaller than or equal to the specular threshold value ($sp_{thr}$), a logical value false (0) is given to the i-th intensity ($I_{1i}$). Then, the logical values of N-number of images regarding to N-bucket algorithm are summed. When the summed logical values is greater than or equal to an integrated specular threshold value ($Sp_{thr}$), a logical value true (1) is given to the specular index ($SpI_1$) of the first direction, and when the summed logical values is smaller than the integrated specular threshold value ($Sp_{thr}$), a logical value false (0) is given to the specular index ($SpI_1$) of the first direction.

Further, an integrated shadow indexes ($ShI_b$) in the plurality of directions (b), which regards to the shadow defects caused by shadow, may be expressed as the following Expression 11.

$$ShI_b = \left(\sum_{i=1}^{N}(I_{bi} < sh_{thr}) \geq Sh_{thr}\right) \quad \text{Expression 11}$$

In the above expression, a shadow threshold value ($sh_{thr}$) and an integrated shadow threshold value ($Sh_{thr}$) may be experimentally determined. The meaning of the Expression 11 is as follows. That is, for example, an i-th intensity ($I_{1i}$) of N-bucket algorithm in the first direction is smaller than a shadow threshold value ($sh_{thr}$), a logical value true (1) is given to the i-th intensity ($I_{1i}$), and when the i-th intensity ($I_{1i}$) is greater than or equal to the specular threshold value ($sp_{thr}$), a logical value false (0) is given to the i-th intensity ($I_{1i}$). Then, the logical values regarding the N-number of images of the N-bucket algorithm are summed. When the summed logical values is greater than or equal to an integrated shadow threshold value ($Sh_{thr}$), a logical value true (1) is given to a shadow index ($ShI_1$) of the first direction, and when the summed logical values is smaller than the integrated shadow threshold value ($Sh_{thr}$), a logical value false (0) is given to the shadow index ($ShI_1$) of the first direction.

By using the visibility indexes (VIb), the specular indexes (SpIb) and the shadow indexes ($ShI_b$) obtained from above Expression 9, Expression 10 and Expression 11, respectively, a confidence index ($C_b$) of each direction (b) is calculated using the following Expression 12.

$$C_b = V_M \cdot VI_b | Sp_M \cdot SpI_b | Sh_M \cdot Sh_b \quad \text{Expression 12}$$

In the above expression, $V_M$, $Sp_M$ and $Sh_M$ has one of logical value true (1) or false (0), and '|' operator means the OR-operator. As described above, by controlling $V_M$, $Sp_M$ and $Sh_M$, items required for the confidence index ($C_b$) may be chosen. For example, when a logical value true (1) is given to all of $V_M$, $Sp_M$ and $Sh_M$, the confidence index ($C_b$) of each direction is obtained considering all of visibility, specular defect and shadow defect. When a logical value false (0) is given to $V_M$ and $Sp_M$, and a logical value true (1) is given to $Sh_M$, the confidence index ($C_b$) of each direction is obtained considering only the shadow defect.

In the present embodiment, for example, the vector fields showing maximum variation and direction of the maximum variation of height are firstly obtained (step S130), and then the confidence indexes of each direction are obtained (step S140). However, the consequence of performance is exemplary. Therefore, the confidence indexes of each direction are firstly obtained, and then the vector fields may be obtained.

Then, the confidence indexes ($C_b$) obtained by using the Expression 12 and the vector fields ($G_b$ (x,y)) obtained by using the Expression 5, integrated vector fields (G (x,y)) is obtained (step S150). For example, the integrated vector fields (G (x,y)) may be obtained by using the following Expression 13.

$$G(x,y) = \text{Median}(G_1 \cdot C_1, G_2 \cdot C_2, \ldots, G_M \cdot C_M) \quad \text{Expression 13}$$

That is, in the vector fields of all directions, the vector fields of which logical value is true (1) is chosen, and then the vector fields of which logical value is true (1) are Median operated to get the integrated vector fields (G (x,y)).

Then, by using the integrated vector fields (G (x,y)) obtained using Expression 13, the height (H (x,y)) of each position (x,y) of the target object, in which all heights ($H_b$ $(_{x,y})$) of all directions (b) are merged, is obtained (step S160). In order for that, the height (H (x,y)) minimizing the following Expression 14 is obtained.

$$|\nabla H - G| \quad \text{Expression 14}$$

In order to minimize the Expression 14, Poisson equation expressed as the following Expression 14 may be used.

$$\nabla^2 H = \nabla \cdot G \quad \text{Expression 15}$$

As described above Expression 15, the divergence operator is applied to the integrated vector fields to set the right side, and Laplacian operator is applied to height (H (x,y)) to set the left side. Then, the height (H (x,y)) satisfying the above Poisson equation is the final goal. The heights ($H_b$ (x,y)) obtained by projecting slit pattern in the direction (b) includes various defects such as defects caused by shadow, total reflection, etc. However, the height (H (x,y)) of the above Expression 15 is obtained from the integrated vector fields (G (x,y)) without above the defects. Therefore, the height (H (x,y)) does not include noises.

For example, in order to solve the above Expression 15 to obtain the solution height (H (x,y)), for example, the continuous Poisson equation with continuous operator ($\partial/\partial x, \partial/\partial y$) in the Laplacian operator and divergence operator is changed to (or approximated to be) a discrete Poisson equation with discrete operator. The discrete Poisson equation may be expressed as the following Expression 16.

$$\frac{h_{m+1,n} - 2h_{m,n} + h_{m-1,n}}{\Delta x^2} + \frac{h_{m,n+1} - 2h_{m,n} + h_{m,n-1}}{\Delta y^2} = g_{m,n} \quad \text{Expression 16}$$

In order to solve the above partial differential equation, the height of boundary is set to be ground. Therefore, the boundary condition of $h_{0n} = h_{Mn} = h_{m0} = h_{mN} = 0$ is applied.

In the above Expression 16, when a unit length in the x-axis and a unit length in the y-axis are supposed to be equal to be one ($\Delta x = \Delta y = 1$), the Expression 16 may be expressed as the following Expression 17.

$$h_{m+1,n} + h_{m-1,n} + h_{m,n+1} + h_{m,n-1} - 4h_{m,n} = g_{m,n} \quad \text{Expression 17}$$

On the other hand, an arbitrary two parameter function may be expanded by using Fourier series as shown in the following Expression 18.

$$h_{m,n} = \sum_{j=1}^{M-1} \sum_{k=1}^{N-1} U_{j,k} \sin\left(\frac{\pi m j}{M}\right) \sin\left(\frac{\pi n k}{N}\right) \quad \text{Expression 18}$$

When the Fourier series expressed by above Expression 18 is supposed to be the solution of the equation expressed by Expression 17 to be applied to the Expression 17, the equation of the following Expression 19 can be obtained.

$$\sum_{j=1}^{M-1} \sum_{k=1}^{N-1} U_{j,k} \begin{bmatrix} \left[\sin\left(\frac{\pi(m+1)j}{M}\right) + \sin\left(\frac{\pi(m-1)j}{M}\right)\right]\sin\left(\frac{\pi n k}{N}\right) + \\ \left[\sin\left(\frac{\pi(n+1)k}{N}\right) + \sin\left(\frac{\pi(n-1)k}{N}\right)\right]\sin\left(\frac{\pi m j}{M}\right) - \\ 4\sin\left(\frac{\pi m j}{M}\right)\sin\left(\frac{\pi n k}{N}\right) \end{bmatrix} = \sum_{j=1}^{M-1} \sum_{k=1}^{N-1} F_{j,k} \sin\left(\frac{\pi m j}{M}\right) \sin\left(\frac{\pi n k}{N}\right) \quad \text{Expression 19}$$

In the above expression, the coefficient $F_{jk}$ of the right side may be expressed as the following Expression 20.

$$F_{jk} = \frac{1}{MN} \sum_{m=1}^{M-1} \sum_{n=1}^{N-1} g_{mn} \sin\left(\frac{\pi m j}{M}\right) \sin\left(\frac{\pi n k}{N}\right) \quad \text{Expression 20}$$

In the above Expression 20, the coefficient $g_{mn}$ may be obtained by applying the divergence operator to the integrated vector fields of the Expression 15 and by Fourier expanding.

Expression 19 may be expressed as following Expression 21 by using the additive formula of sine function.

$$\sum_{j=1}^{M-1} \sum_{k=1}^{N-1} \left[\left(2\cos\left(\pi\frac{j}{M}\right) - 2\cos\left(\pi\frac{k}{N}\right) - 4\right)U_{jk} - F_{jk}\right] \sin\left(\frac{\pi m j}{M}\right) \sin\left(\frac{\pi n k}{N}\right) = 0 \quad \text{Expression 21}$$

Therefore, the coefficient $U_{jk}$ of the Expression 18 may be expressed as the following Expression 22, so that the solution height of Expression 15 may be obtained.

$$U_{jk} = \frac{F_{jk}}{2\cos\left(\frac{\pi j}{M}\right) + 2\cos\left(\frac{\pi k}{N}\right) - 4} \quad \text{Expression 22}$$

According to the present exemplary embodiment, in the heights obtained by applying slit pattern in various directions, heights without defects such as the shadow defect, the specular defect, etc. are chosen. And the heights without defects are integrated to enhance accuracy.

Figure 2:
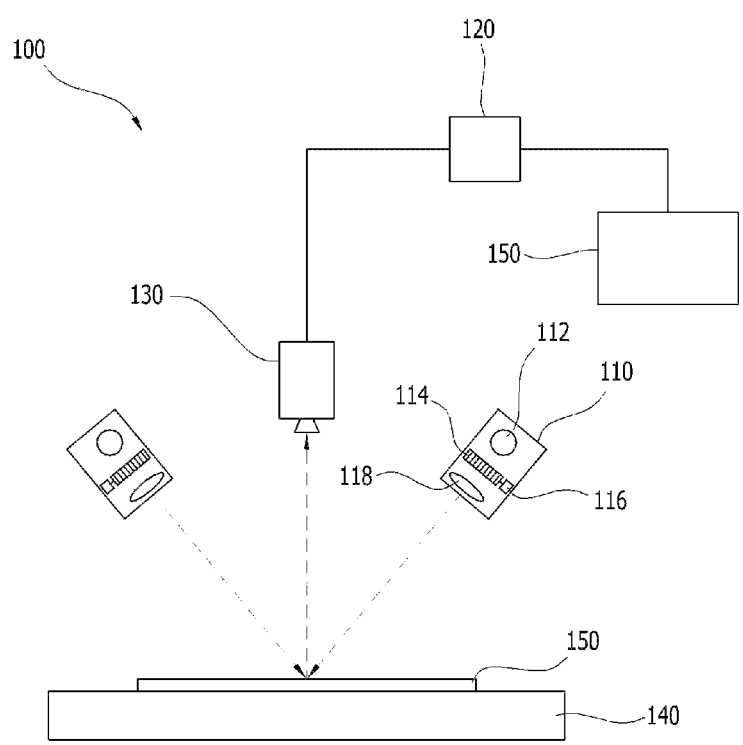
FIG. 2 is a schematic view showing an apparatus of profiling a surface according to an exemplary embodiment of the present invention.
Figure 3:
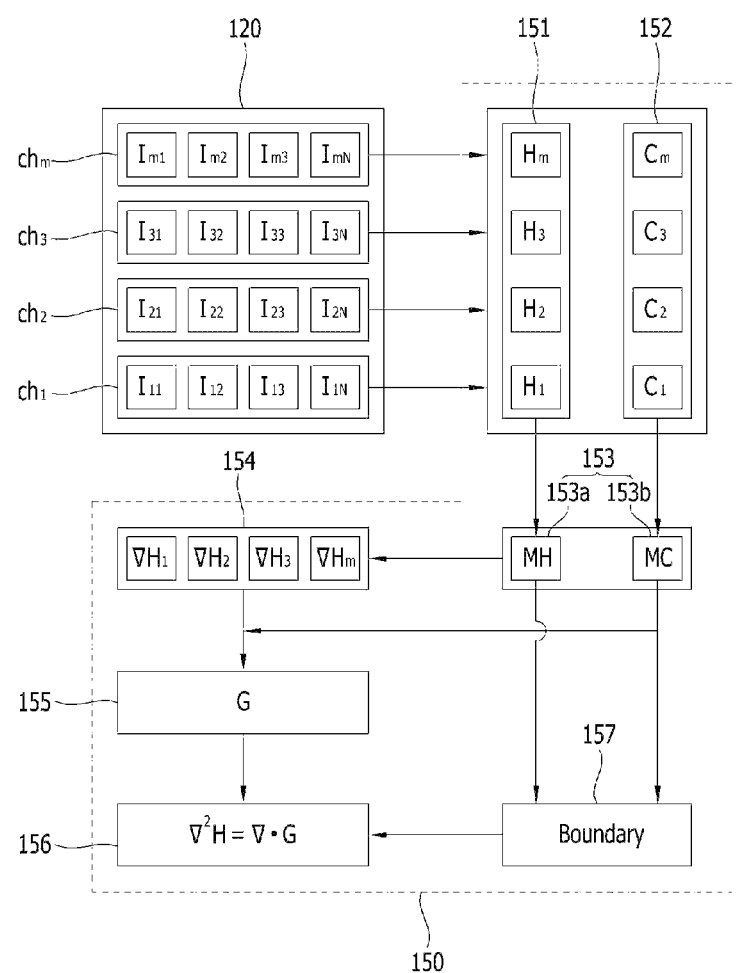
FIG. 3 is a block diagram showing a memory unit and a computing part in FIG. 2 according to an exemplary embodiment.

FIG. 2 is a schematic view showing an apparatus of profiling a surface according to an exemplary embodiment of the present invention, and FIG. 3 is a block diagram showing a memory unit and a computing part in FIG. 2 according to an exemplary embodiment.

Referring to FIG. 2, an apparatus of profiling a surface 100 according to an exemplary embodiment of the present invention includes a supporting part 140 supporting and carrying a substrate S with a target object, at least two pattern image projecting parts 110 projecting pattern image toward the substrate S, an image-capturing part 130 capturing an image of the substrate S, a memory unit 120 storing a captured images and a computing part 150 performing a various calculations.

The pattern image projecting part 110 projects a pattern image onto the substrate S in order to acquire a profile of the target object on the substrate S. For example, the pattern image projecting part 110 includes a light source 112 generating light, a grating 114 converting the light generated by the light source 112 into a pattern image, a grating shifter 116 shifting the grating 114 and a lens 118 projecting the pattern image converted by the grating 114 toward the target object.

The grating 114 may be shifted by $2\pi/N$ through the grating shifter 116 such as a piezo actuator (PZT) for shifting the pattern image, wherein 'N' is a natural number more than one. The apparatus of profiling a surface 100 may include a plurality of the pattern image projecting parts 110 disposed along a circumference with respect to the image-capturing part 130 in order to enhance degree of precision. The plurality of pattern image projecting parts 110 are disposed on a skew with respect to the substrate S to project pattern image onto the substrate S in a plurality of directions.

The image-capturing part 130 captures an image of the substrate S onto which the pattern image is projected by the pattern image projecting part 110. For example, the image-capturing part 130 may be disposed directly over the substrate S. The image-capturing part 130 may include a CCD camera or a CMOS camera for capturing an image.

The memory unit 120 stores the images captured by the image-capturing part 130. The memory unit 120 includes a plurality of sections, and N-number of images captured according to the N-bucket algorithm in one direction among the plurality of directions may be stored in one of the sections.

The computing part 150 performs various operations to obtain heights corresponding to various directions by using the pattern images stored in the memory unit 120, the vector fields showing direction of maximum variation of the heights, the confidence indexes of the heights corresponding to the directions, the integrated vector fields by using the confidence indexes and the vector fields, and then heights of each position of the target object by using the integrated vector fields.

Referring to FIG. 3, the computing part 150 performing the above operations may include a height calculation unit 151, a confidence index calculation unit 152, a storing unit 153, a vector fields calculation unit 154, an integrated vector fields calculation unit 155, a boundary setting unit 157 and a Poisson equation solving unit 156.

The height calculation unit 151 calculates heights corresponding to various directions, respectively by using the pattern images. In detail, the height H1 corresponding to the first direction is calculated, for example, through Expression 4 by using N-number of images ($I_{11}, I_{12}, \ldots, I_{1N}$) corresponding to N-bucket algorithm by projecting slit pattern image in a first channel ($Ch_1$) corresponding to a first direction, and the height $H_m$ corresponding to the m-th direction is calculated, for example, through Expression 4 by using N-number of images ($I_{m1}, I_{m2}, \ldots, I_{mN}$) corresponding to N-bucket algorithm by projecting slit pattern image in an m-th channel ($Ch_m$) corresponding to an m-th direction.

The confidence index calculation unit 152 calculate the confidence indexes ($C_1, C_2, \ldots, C_m$) regarding to the heights ($H_1, H_2, \ldots H_m$) of each directions (1 to m) by using Expression 12.

The storing unit 153 stores the calculated heights ($H_1, H_2, \ldots H_m$) and the calculated confidence indexes ($C_1, C_2, \ldots, C_m$)

The vector fields calculation unit 154 calculates the vector fields ($G_1, G_2, \ldots G_m$) showing direction of maximum variation by using the heights ($H_1, H_2, \ldots H_m$) stored in the storing unit 153 through Expression 5.

The integrated vector fields calculation unit 155 calculates the integrated vector fields (G) by using the confidence indexes ($C_1, C_2, \ldots, C_m$) and the vector fields ($G_1, G_2, \ldots G_m$) corresponding to the directions (1 to m) through Expression 13.

The boundary setting unit 157 sets a boundary of the target object. The boundary setting unit 157 may set the boundary of the target object by using weighted averaging method expressed as the following Expression 23.

$$h_i = \frac{\sum_{j=0}^{m} h_j \cdot w_j}{\sum_{j=0}^{m} w_j}$$

Expression 23

In the above Expression 23, wj is a weighting factor. In this case, the boundary is not limited to the edge of the target object but may expand toward the substrate on which the target object is disposed.

The Poisson equation solving unit 156 solves the Poisson equation of Expression 15 to get the height of the target object by applying the boundary condition obtained from the boundary setting unit 157, of which the right side is set by applying the divergence operator to the integrated vector fields (G) and of which the left side is set by applying the Laplacian operator to the height.

The method of operation of each unit is explained in detail referring to FIG. 1. Therefore, further explanation will be omitted.

The apparatus of profiling a surface 100 according an exemplary embodiment of the present invention projects slit pattern image toward the target object on the substrate S by the pattern image projecting part 110, and captures the image reflected by the target object to obtain the profile of the target object. However, the apparatus of profiling a surface 100 of FIG. 2 is exemplary. The apparatus of profiling a surface according to the present invention may have various hardware variations. For example, the apparatus of profiling a surface may have more than two pattern image projecting parts 110 and the image-capturing part with different elements.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of profiling a surface, comprising:
    projecting slit pattern light toward a target object in at least two directions in sequence by at least one pattern image projecting part to obtain pattern images reflected on the target object;
    obtaining heights by using the pattern images according to the directions by a computing part;
    obtaining vector fields showing a direction of maximum variation of height by the computing part;

obtaining confidence indexes of the heights corresponding to the at least two directions by the computing part;

obtaining integrated vector fields by using the confidence indexes and the vector fields by the computing part; and calculating height of each position of the target object by using the integrated vector fields by the computing part.

2. The method of profiling a surface of claim 1, wherein the confidence indexes include at least one of a visibility index, a specular index and a shadow index.

3. The method of profiling a surface of claim 2, wherein the visibility index is a logical value true (1) when visibility is greater than a visibility threshold value, and the visibility index is a logical value false (0) when the visibility is equal to or smaller than the visibility threshold value, the specular index is a logical value true (1) when an summed intensity generated by summing logical values of intensity that is greater than a threshold specular threshold value is greater than or equal to an integrated specular threshold value, and the specular index is a logical value false (0) when the summed intensity is smaller than the integrated specular threshold value, the shadow index is a logical value true (1) when an summed intensity generated by summing logical values of intensity that is smaller than a threshold shadow threshold value is greater than or equal to an integrated shadow threshold value, and the shadow index is a logical value false (0) when the summed intensity is smaller than the integrated shadow threshold value, and the confidence indexes of the heights corresponding to the at least two directions are obtained by using the visibility index, the specular index and the shadow index.

4. The method of profiling a surface of claim 3, wherein the confidence indexes of the heights corresponding to at least two directions are obtained by logical add of the visibility index, the specular index and the shadow index.

5. The method of profiling a surface of claim 3, wherein the confidence indexes of the heights corresponding to at least two directions are obtained by logical add of the visibility index multiplied by an optional logical value of true or false, the specular index multiplied by the optional logical value and the shadow index multiplied by the optional logical value.

6. The method of profiling a surface of claim 5, wherein the integrated vector fields are obtained by, selecting the vector fields of which a logical value of the confidence index is true; and obtaining the integrated vector fields by medial operation of the selected vector fields.

7. The method of profiling a surface of claim 6, wherein calculating height of each position of the target object is performed by, making Poisson equation of which right side is obtained by applying divergence operator to the integrated vector fields and of which left side is obtained by applying Laplacian operator to the height; and solving the Poisson equation to get a solution corresponding to the height.

8. The method of profiling a surface of claim 7, wherein solving the Poisson equation is performed by, transforming the Poisson equation with a continuous operator ($\partial/\partial x$, $\partial/\partial y$) into discrete Poisson equation with discrete operator; and expressing a solution of the discrete Poisson equation with Fourier series to get a coefficient of the Fourier series.

9. An apparatus of profiling a surface, comprising:

a supporting part supporting a substrate with a target object;

a pattern image projecting parts projecting slit pattern light toward the target object in at least two directions;

an image-capturing part capturing pattern images corresponding the at least two directions, which is reflected by the target object in sequence;

a memory unit storing the pattern images captured by the image-capturing part; and a computing part obtaining heights corresponding to at least two directions by using the pattern images, obtaining vector fields corresponding to the at least two directions by gradient operating the heights, obtaining confidence indexes of the heights corresponding to at least two directions, obtaining integrated vector fields by using the confidence indexes and the vector fields, and computing height of each position of the target object by using the integrated vector fields.

10. The apparatus of profiling a surface of claim 9, wherein the computing part comprises, a height calculation unit calculating the heights corresponding to the at least two directions by using the pattern images in sequence;

a confidence index calculation unit calculating confidence indexes of the heights corresponding to the at least two directions;

a storing unit storing the calculated heights and the calculated confidence indexes;

a vector fields calculation unit calculating the vector fields;

an integrated vector fields calculation unit calculating the integrated vector fields by using the confidence indexes and the vector fields corresponding to the at least two directions;

a boundary setting unit setting a boundary of the target object; and a Poisson equation solving unit solving Poisson equation of which right side is obtained by applying divergence operator to the integrated vector fields and of which left side is obtained by applying Laplacian operator to the height by applying a boundary condition to the boundary set by the boundary setting unit.

* * * * *